July 23, 1963   E. J. ONNY ETAL   3,098,927
BUTT WELDING APPARATUS
Filed Sept. 19, 1961

INVENTORS,
EDWARD JONNY,
STANLEY REZIN
BY
ATTORNEY.

though lightly, is to keep the contiguous ends of the associated members close together and hence have the screws 19, 19' bear against the adjacent surfaces of the work-shifting members 18, 18'.

United States Patent Office
3,098,927
Patented July 23, 1963

3,098,927
BUTT WELDING APPARATUS
Edward J. Onny, 346 60th St., Brooklyn, N.Y., and Stanley Rezin, 62—39 60th Drive, Maspeth, N.Y.
Filed Sept. 19, 1961, Ser. No. 139,135
2 Claims. (Cl. 219—57)

The present invention relates to welding apparatus and more particularly to means for making a butt weld. Since we use a press-type welding machine, our present invention may be in the form of an attachment for spot welding machines. In fact, we have chosen such as the embodiment herein presented to explain and set forth this invention. It is evident that owners of spot welding machines can readily convert them for butt welding work with our invention. Of course, machines may be built where our invention is an integral part of their structure.

The principal object of this invention is to provide a novel and improved butt welding apparatus of the character set forth, in which the pieces of work to be joined are automatically maintained in end-to-end abutment during the welding operation, and as mentioned, this invention may be sold as an attachment for spot welding machines.

Another object thereof is to provide a novel and improved butt welding apparatus of the type described which is simple in construction, easy to use, reasonable in cost and efficient in carrying out the purposes for which it is designed.

Other objects and advantages will become apparent as this disclosure proceeds.

For the practice of this invention, one form it may assume is to have the ram of a vertically acting press-type machine carry a depending pair of work-shifting members, each to cooperate respectively with one of a pair of work-supporting members carried on the bed. The members of each such pair are electrically insulated from each other, spring-biased to be apart a predetermined distance respectively and capable of movement towards and away from each other. The work-supporting members are preferably the welding electrodes of the apparatus. The work-shifting members may be swingable about suitable axes or fulcrums on the ram and each preferably ends in a blade edge to engage a work piece. The distance between said axes is comparatively large in relation to said edges.

Upon bringing the ram towards the bed, the work-shifting members grip the work-pieces respectively and continued pressure thereon, causes the work-shifting members to automatically move towards each other, whereby the work pieces which the operator had set in abutment or nearly so on the supports, are maintained in constant abutment. Because of the appreciable pressure existing, the supports will also move towards each other as the work-shifting members approach each other; there occurring no relative movement of any work piece on its support.

If said pressure is not too great, the work-supporting members may be fixed, whereupon the work pieces will be slid thereon towards each other when the work-shifting members approach each other.

Also if desired, one work piece can be held fast on one work-supporting member in any suitable manner or manually, in which instance only one work-shifting member is used.

In the accompanying drawing forming part of this specification, similar characters of reference indicate corresponding parts in all the views.

FIGS. 2–6 are drawn to a common enlarged scale.

Figure 1:
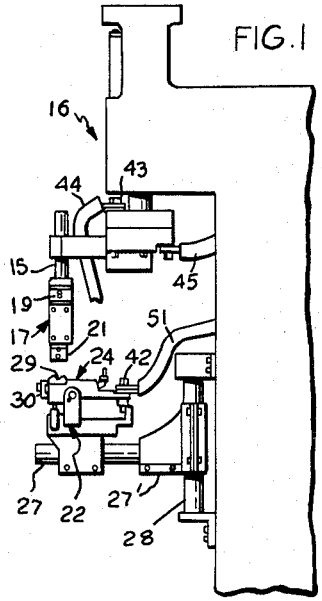
FIG. 1 is a fragmentary side view of a welding machine embodying the teachings of this invention.
Figure 4:
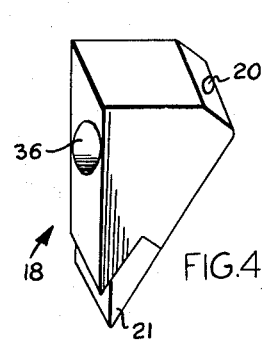
FIG. 4 is a perspective view of one of the work-shifting members.
Figure 5:
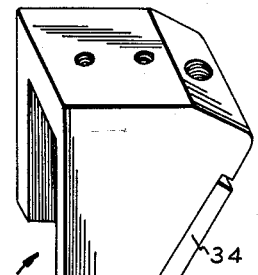
FIG. 5 is a perspective view of a work-shifting member's housing which is secured to the ram in this machine and swingably carries its associated work-shifting member. This view is of such housing per se.
Figure 6:
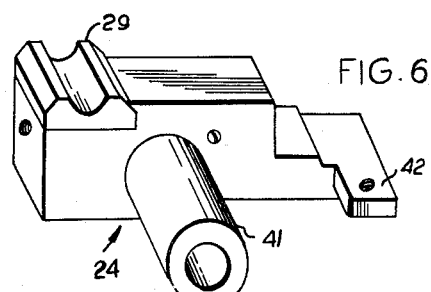
FIG. 6 is a perspective view showing one of the work-supporting members.
Figure 2:
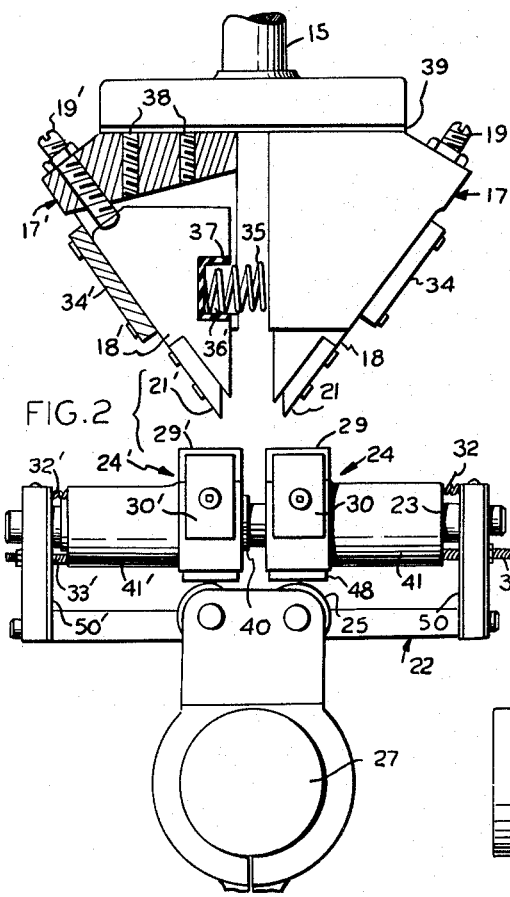
FIG. 2 is a front view, partly in section, showing the work-shifting members carried by the ram and the work-supporting members carried on the bed. This is a preferred embodiment of this invention.

In the drawing, the numeral 15 designates the ram of a press-type vertically acting spot welding machine 16, carrying the horizontally-spaced housings 17, 17' which depend therefrom. In each housing and extending downwardly outwardly therefrom, is a loose work-shifting member. These, indicated by the numerals 18, 18' are respectively set against the adjustable fulcrum screws 19, 19' which are threadedly engaged through the respective bodies of said housings; each said screw fitting into a socket as indicated at 20. At their lower ends, each of said work-shifting members has a gripping blade. These are denoted by the numerals 21, 21' respectively. On a U-frame designated generally by the numeral 22 which is secured to the bed of the machine, there is a horizontal track rod 23 carrying the work-supporting members denoted generally by the numerals 24, 24' respectively; said track rod spanning the arms of said U-member. Each of said work-supporting members rides on the rollers as indicated at 25 and 26 which are carried on the bed member, which in the instance shown, is adjustable on a horizontal beam 27 which terminates in the bracket 27', adjustable along the column 28 on the machine proper. The numerals 29, 29' denote work-supporting anvils on the respective work-supporting members which are held in place respectively by the clamping members 30, 30' and are of course exchangeable for others to suit the work pieces, as the rods 31, 31'. The work-supporting members 24, 24' are biased to be apart due to the action of the springs 32, 32' and the distance of their separation is adjustable by means of the screws 33, 33' respectively.

Each of the housings 17, 17' is an inverted channel form, closed at one end by a plate to serve as a stop for the associated work-shifting member and thereby limit the extent of separation of such members. These plates 34, 34' are on the channel ends which are furthest apart in the assembly and converge towards the bed of the machine. There is a stressed compression coil spring 35 between the work-shifting members to urge them apart; one end of such spring being set in the socket 36 of member 18 and the other end being set within the insulative cup 37 which lines the socket 36' in the member 18'. The screws 38 and the work-shifting members 18, 18' are insulated from the ram by expedients which are readily understandable and within the knowledge of those versed in the art; the numeral 39 indicating sheet material which is part of such insulation structure. It is evident that the work-shifting members are electrically insulated from each other.

The remote end faces of the work shifting members which are in contact with said plates 34, 34' respectively when the ram is in raised position, are of course in downwardly convergent relation; the distance between the sockets 20, 20' being comparatively larger than the distance between the gripping edges of the blades 21, 21' which are in position to engage, each a work piece 30, 30' on the work-supporting members 24, 24' respectively, when the ram 15 is lowered. Besides urging the work-shifting members 18, 18' apart, the action of the spring 35 is also to keep said members against the fulcrums 19, 19' respectively.

The work-supporting anvils 29, 29' are quite near to each other and directly under the edges of the work-engaging blades 21, 21' which are for engagement with the work-pieces 30, 30' respectively. The work-supporting members 24, 24' are electrically insulated from each other in any suitable fashion and same may include the insulative liner 40 through the slide bearing 41'. Similar provision may be made (though not shown) for the slide bearing 41. The work-supporting members are connected to the output terminals of the welding transformer of the machine 16, by connection to the terminal lugs as shown at 42; there being a similar lug on the member 24'.

Since the showing in FIG. 1 is to have this invention an as attachment to a spot welding machine 16, the usual terminal connectors on the machine are connected respectively at 43 and to the lug 42; an auxiliary cable 44 being provided with this attachment, which connects the cable 45 from 43 to the lug akin to 42 of the member 24'.

Upon operation of the machine by its usual controls with work pieces 30, 30' set in abutment by the operator, the ram 15 will descend and the blades 21, 21' will respectively engage and grip said work pieces. Upon continued downward pressure of the ram, the work-shifting members 18, 18' will be swung whereby their bottom ends approach each other. This will cause the blades 21, 21' to constantly hold the work pieces in abutment while the weld takes place for said blades will shift said work pieces towards each other as movement will permit.

Figure 7:
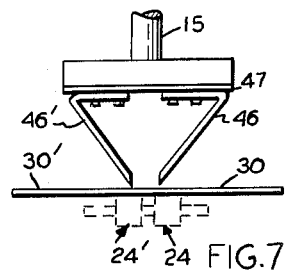
FIG. 7 is a front view of a modified form of work-shifting members mounted on the ram, drawn to a reduced scale.
Figure 3:
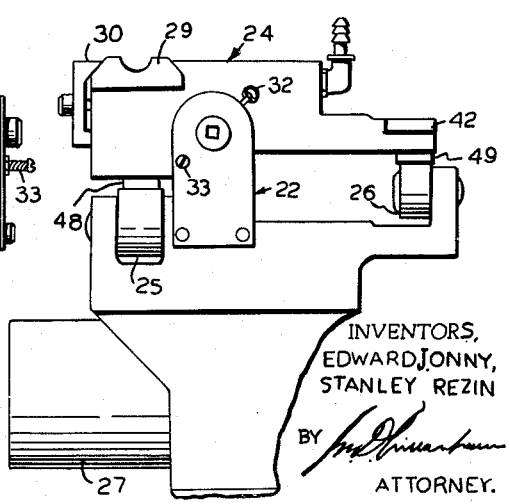
FIG. 3 is a side view of the work-supporting members on the bed of the machine.

In the modified construction shown in FIG. 7, each work-shifting member may be a blade spring of stock bent in acute angle form as 46, 46'. These are mounted spaced and insulated from each other on the ram 15 on insulative material 47 and set that their free arms converge downwardly; work-gripping edges being provided at their respective lower extremities to engage the work pieces 30, 30' respectively.

It is evident that in both embodiments herein shown, the work-shifting members will spring apart when the ram lifts off the work. So will the work-supporting members.

In the scheme for insulation of the work-carrying members 24, 24', the pads 48, 49 and their mates on the left hand side of the machine, are of insulative material and insulation plates 50, 50' are interposed in the bracket structure 22 with all attaching screws insulated, which is well understood in this art without further illustration.

The welding current supply terminals 45 and 51 of the machine may be connected to any one of the members contacting one of the work pieces respectively.

This invention is capable of numerous forms and various applications without departing from the essential features herein disclosed. It is therefore intended and desired that the embodiments shown herein be deemed merely illustrative and not restrictive and that the patent shall cover all patentable novelty herein set forth, reference being had to the following claims rather than to the specific description herein to indicate the scope of this invention.

We claim:

1. In an electric welding apparatus, the combination of two spaced work-supporting members on the bed of a press-type machine, for carrying respectively one of two pieces of work in abutment between said members, two spaced work-shifting members extending from the ram of said press-type machine, directly towards said work-supporting members respectively, adapted to be intercepted respectively by pieces of work on the respective work-supporting members upon movement of said ram towards the bed and to engage said work pieces respectively; said work-shifting members being swingably mounted about spaced axes on the ram so that at least the respective parts of said work-shifting members which contact the work pieces move towards and away from each other; the distance between said axes being greater than the distance of those parts of the respective work-shifting members which contact the respective pieces of work; such axes being each offered by the tip of a screw threadedly engaged on the ram; each work-shifting member having a socket; the tips of said screws resting in said sockets respectively, means on said apparatus, biasing said work-shifting members apart; those surfaces of said work-shifting members which are most remote, being in converging relation towards the bed; elements fixed on said ram, in linear contact with said surfaces respectively and means on the machine, associated with said work-shifting members and arranged to make said work-shifting members move upon their interception by the work pieces and continued pressure applied to the ram so that the said parts contacting said work pieces, move towards each other in engagement with said work pieces respectively whereby said work pieces are maintained in constant abutment; said work-supporting members and work-shifting members being electrically insulated from each other on the bed and ram respectively; at least one of said members which contacts one piece of work respectively, being electrically conductive and adapted for connection to a welding current supply terminal; only one of the members contacting one work piece serving for such connection.

2. An apparatus as defined in claim 1, wherein the work-supporting members are movably mounted on the bed for movement along with the work shifting members and including means biasing said work-supporting members apart and means to limit such separation.

References Cited in the file of this patent

UNITED STATES PATENTS 2,288,693    Fotie _____ July 7, 1942
2,401,359    Lilja _____ June 4, 1946